{ | | | |
--- | --- | --- | ---
United States Patent [19] | | [11] Patent Number: | 5,061,751
Patton | | [45] Date of Patent: | Oct. 29, 1991

[54] VINYLPYRROLIDONE GRAFTED POLYOLEFINS IN POLYMER BLENDS AND COMPOSITES

[75] Inventor: Tad L. Patton, Baytown, Tex.

[73] Assignee: Exxon Chemical Patents Inc., Linden, N.J.

[21] Appl. No.: 360,493

[22] Filed: Jun. 2, 1989

[51] Int. Cl.$^5$ ............... C08L 29/04; C08L 51/06; C08L 23/04; C08L 23/10

[52] U.S. Cl. ............................ 525/57; 525/58; 525/66; 525/67; 525/69; 525/73; 525/283; 524/35

[58] Field of Search ............ 525/57, 73, 283, 58, 525/66, 67, 69; 524/35

[56] References Cited

U.S. PATENT DOCUMENTS

| | | | |
|---|---|---|---|
| 3,049,507 | 8/1962 | Stanton et al. | 260/45.5 |
| 3,073,667 | 1/1963 | Bonvicini et al. | 8/115.5 |
| 3,157,560 | 11/1964 | Livingston et al. | 161/106 |
| 3,290,207 | 12/1966 | Magat et al. | 161/178 |
| 3,458,597 | 7/1969 | Jabloner | 260/877 |
| 3,497,573 | 2/1970 | Hostetler | 260/876 |
| 3,644,581 | 2/1972 | Knaack | 260/878 |
| 3,644,582 | 2/1972 | Knaack | 260/878 |
| 3,683,049 | 8/1972 | Kaku et al. | 260/876 |
| 3,700,449 | 10/1972 | Lerner | 96/48 |
| 3,728,417 | 4/1973 | Knaack | 260/878 |
| 3,752,868 | 8/1973 | Kaku et al. | 260/876 |
| 3,800,007 | 3/1974 | Bafford | 260/877 |
| 3,975,463 | 8/1976 | Hirata et al. | 525/57 |
| 4,143,218 | 3/1979 | Adams et al. | 429/254 |
| 4,451,260 | 5/1984 | Mitra | 604/890 |
| 4,451,599 | 5/1984 | Odorzynski et al. | 525/169 |
| 4,552,801 | 11/1985 | Odorzynski et al. | 428/220 |
| 4,575,532 | 3/1986 | Schmukler et al. | 525/57 |
| 4,590,241 | 5/1986 | Hohlfeld | 525/73 |
| 4,611,031 | 9/1986 | Galluccio et al. | 525/73 |
| 4,657,972 | 4/1987 | Giles et al. | 525/57 |
| 4,743,258 | 5/1988 | Ikada et al. | 623/1 |
| 4,921,907 | 5/1990 | Negi et al. | 525/57 |
| 4,942,096 | 7/1990 | Abe et al. | 525/57 |
| 4,957,974 | 9/1990 | Ilenda et al. | 525/57 |

FOREIGN PATENT DOCUMENTS

| | | |
|---|---|---|
| 0001313 | 4/1979 | European Pat. Off. . |
| 0203459 | 12/1986 | European Pat. Off. . |
| 0207440 | 1/1987 | European Pat. Off. . |
| 0249513 | 12/1987 | European Pat. Off. . |
| 47-20327 | 9/1972 | Japan . |
| 1114338 | 5/1968 | United Kingdom . |
| 1338810 | 11/1973 | United Kingdom . |
| 2022597 | 12/1979 | United Kingdom . |
| 1558991 | 1/1980 | United Kingdom . |
| 1588065 | 4/1981 | United Kingdom . |

*Primary Examiner*—Carman J. Seccuro
*Attorney, Agent, or Firm*—Myron N. Kurtzman; Jaimes Sher

[57] ABSTRACT

A thermoplastic composition containing a first phase of a polar thermoplastic polymer, a second phase of nonpolar polyolefin incompatible therewith, and a vinylpyrrolidone grafted polyolefin at least at an interface to compatibilize the different phases. A mixed phase monolayer of the composition containing ethylene-vinyl alcohol copolymer blended with vinylpyrrolidone grafted polypropylene as the first phase, and polypropylene as the second phase, has good oxygen and moisture barrier properties for food packaging applications. Also disclosed is a tieless multilayer laminate of the composition having an interlayer of a blend of ethylene-vinyl alcohol copolymer and vinylpyrrolidone grafted polypropylene and outer layers of polypropylene. The laminate has good oxygen and moisture barrier properties for food packaging applications. Further disclosed is a method for grafting vinylpyrrolidone onto polypropylene and polyethylene by melt blending the vinylpyrrolidone and the polyolefin to be grafted in the presence of a free radical initiator for a time effective to obtain a vinylpyrrolidone grafted product.

50 Claims, No Drawings

VINYLPYRROLIDONE GRAFTED POLYOLEFINS IN POLYMER BLENDS AND COMPOSITES

FIELD OF THE INVENTION

The present invention relates to polyolefins grafted with vinylpyrrolidone and to polymer blends and composites containing them, and more particularly to blends of incompatible polar polymers with non-polar thermoplastic polymers containing vinylpyrrolidone grafted polyolefins as compatibilizers, and to composite structures such as oxygen barrier films containing vinylpyrrolidone grafted polyolefins.

BACKGROUND OF THE INVENTION

Various films for use in the food and health care packaging industries are known. These films are generally selected on the basis of key properties desirable for packaging applications. Packaging films desirably have good mechanical properties to provide strength and processability, good optical clarity, and good barrier properties. In food packaging, this latter property is of extreme importance to maintain the food in a fresh and unspoiled condition by inhibiting the transmission of oxygen and moisture into the package. Other important properties for food packaging films include heat sealability and heat stability. Heat stability is particularly important in those applications wherein the package and the contents thereof are heated together, for example, in boiling water or by microwaves.

Various polymers used in food packaging films generally contain one or more of the desired properties, but not usually all. For example, ethylene-vinyl alcohol copolymer films have good oxygen barrier properties; however, such films do not usually have good heat sealability properties and the oxygen barrier properties thereof are adversely affected by moisture and high humidity. On the other hand, polypropylene has an unacceptably high oxygen permeability, but is heat sealable, heat stable, and as a consequence of its hydrophobicity, it is a good moisture barrier. Therefore, multilayer food packaging films are manufactured by using ethylene-vinyl alcohol copolymer as an interlayer between outer layers of polypropylene. Since polypropylene does not adhere well to ethylene-vinyl alcohol copolymer, it is necessary to employ a tie layer between the layers. Maleated polypropylene is commonly used for this purpose in multiple layer films employed in the food packaging industry. The outer skin layers of polypropylene function as moisture barriers and provide for good heat sealability, heat stability, and structural properties of the package, while the ethylene-vinyl alcohol copolymer interlayer functions as an effective oxygen barrier to preserve the freshness of the food packaged therein. Such films are, however, disadvantageous in that multiple layer films are inherently more complicated and expensive to manufacture than monolayer films.

It is known from EPO publication 207,440 to form a laminated film containing an interlayer of ethylene-vinyl alcohol-vinylpyrrolidone terpolymer, tie layers on opposite sides thereof containing maleated polypropylene, and outer layers containing polypropylene. The film is stated to have good clarity without haze, no cracks, even stretching, and low oxygen permeability.

It is known from U.S. Pat. Nos. 4,451,599 and 4,552,801 to use homopolyvinylpyrrolidone as a plasticizer in a blend with ethylene-vinyl alcohol copolymer to improve elongation, tear strength and impact. This blend can be used in a layer of a laminate containing outer layers such as polyamide or polyolefin which are stated to function as water vapor barriers. An adhesive layer is used between the interlayer and the outer layers.

It is known from U.S. Pat. No. 3,700,449 to use homopolyvinylpyrrolidone as an oxygen-impermeable barrier layer for a photographic photoconductor material.

It is known from U.S. Pat. No. 4,451,260 and Japanese Patent Application 47-20327 to use polyvinylpyrrolidones in pharmaceutical coatings.

It has been suggested to graft vinylpyrrolidone onto polyolefins by ionic irradiation of a mixture of polyolefin and vinylpyrrolidone, by heat polymerization of such a mixture in the presence of a radical polymerization initiator such as a peroxide or azo compound, or by peroxidizing or hydroperoxidizing the polyolefin in advance with an oxidizing agent or to form free radicals of the polyolefin by heat or by a mechanical operation and then contacting the vinylpyrrolidone monomer therewith to carry out the graft copolymerization. In the prior art, this is done in a suspension or solution as described, for example, in U.S. Pat. Nos. 3,458,597; 3,497,573; 3,644,581; 3,644,582; 3,683,049; 3,728,417; 3,752,868, 3,800,007; EPO Publication 1,313; and U.K. Patent Applications 1,114,338, 1,558,991; and 2,022,597; or by grafting the vinylpyrrolidone onto the surface of a solid polyolefin substrate such as a membrane, film, fiber, tube or the like as described, for example, in U.S. Pat. Nos. 3,049,507; 3,073,667; 3,157,560; 3,290,207; 4,743,258; 4,143,218, U.K. Patent Applications 1,338,810; and 1,588,065; and EPO Publications 203,459; and 249,513.

As far as applicant is aware, there is no prior art teaching the grafting of a vinylpyrrolidone onto a polyolefin by melt blending the polyolefin at elevated temperatures with vinylpyrrolidone in the presence of a free radical initiator. Nor is applicant aware of any prior art teaching the use of a vinylpyrrolidone grafted polyolefin in blends of incompatible polar and non-polar polymers, e.g. blends of ethylene-vinyl alcohol copolymer and polypropylene, for the purpose of compatibilizing the incompatible blend components, nor the use of a vinylpyrrolidone grafted polyolefin in a blend with an oxygen barrier resin such as ethylene-vinyl alcohol copolymer for the purpose of promoting adhesion to a non-polar layer such as polypropylene or polyethylene in a tieless multilayer film, or blended with polypropylene to promote adhesion to ethylene-vinyl alcohol copolymer. Finally, applicant is not aware of any prior art teaching a low oxygen permeable monolayer film containing a hydrophobic water barrier resin such as polypropylene, a hydrophilic oxygen barrier resin such as ethylene-vinyl alcohol copolymer and a vinylpyrrolidone grafted polyolefin.

SUMMARY OF THE INVENTION

The present invention employs a vinylpyrrolidone grafted polyolefin to compatibilize polar and non-polar polymers, and/or to bind the incompatible polymers together. The ability of a vinylpyrrolidone grafted polyolefin to compatibilize polar and non-polar polymers is exploited in mixed phase blends of the incompatible polymers to form a composition having improved properties and/or which retains the desirable properties of the blend components. The improved adhesion obtained when the vinylpyrrolidone grafted polyolefin is employed in composites enables the preparation of manufactured products without the use of an additional adhesive.

In one aspect, the invention provides a plural-phase thermoplastic composition including a first polar thermoplastic polymer phase and a second non-polar polyolefin phase. A vinylpyrrolidone grafted polyolefin is at least interfacially present in an amount effective to bind the two phases together.

In another aspect, the invention provides monolayer oxygen barrier films. The monolayer is a mixture of first and second phases. The first phase comprises an ethylene-vinyl alcohol copolymer. The second phase comprises a non-polar polyolefin. A vinylpyrrolidone grafted polyolefin is present at least at interfaces between the first and second phases in an amount sufficient to bond or compatibilize them.

In another aspect of the invention, there is provided a multilayer oxygen barrier film. The multilayer film has an interlayer of ethylene-vinyl alcohol copolymer. Outer layers of polyolefin are bonded to the interlayer on either side thereof to form a tieless multilayer film. Vinylpyrrolidone grafted polyolefin is blended with the ethylene-vinyl alcohol copolymer in the interlayer or the polyolefin in the outer layers.

A further aspect of the invention is a method for preparing vinylpyrrolidone grafted polyolefins. The method includes melt blending a polyolefin with a vinylpyrrolidone in the presence of a free radical initiator at a temperature and for a time effective to graft polyvinylpyrrolidone onto the polyolefin. The grafting may be effected by adding an initiator in liquid vinylpyrrolidone to premelted polyolefin under shear conditions. The vinylpyrrolidone grafted polyolefin may be separated and purified from any unreacted vinylpyrrolidone and homopolyvinylpyrrolidone by, for example, solvent extraction.

A still further aspect of the invention is a vinylpyrrolidone melt grafted polyolefin obtained by melt blending a polyolefin with a vinylpyrrolidone in the presence of a free radical initiator at a temperature and for a time to graft the vinylpyrrolidone onto the polyolefin.

DETAILED DESCRIPTION OF THE PREFERRED EMBODIMENTS

The three essential components used in the compositions according to the present invention are a polar polymer, a non-polar polymer and a vinylpyrrolidone grafted polyolefin (VPGO). Thermoplastic polar polymers include, for example, polyamides, polyesters, polyvinyl chlorides, polyvinylidene chlorides, polyureas, polycarbonates, polyacrylonitriles, polyacrylates, polymethacrylates, celluloses (including modified celluloses), polyvinyl alcohols and various polyolefin copolymers containing relatively high proportions of a polar comonomer. Such polar polymers are generally characterized by incompatibility with non-polar polymers, particularly non-polar polyolefins. The more preferred polar polymers, such as for food packaging applications, have low oxygen transmission rates.

A particularly preferred class of polar polymers are the copolymers of ethylene and vinyl alcohol. The ethylene-vinyl alcohol copolymer (EVOH) may contain from about 30 to about 80 mole percent vinyl alcohol, preferably from 40 to 75 mole percent, and especially from 50 to 72 mole percent. The EVOH may have a melt index (MI) of from about 0.1 to about 20, preferably from 0.5 to 10, and especially from 1 to 8. As used herein, MI in reference to ethylene polymers and copolymers is determined according to ASTM D-1238, condition 190° C. and 2.160 kg (condition E) unless otherwise specified. Although polar polymers other than EVOH may be employed, for clarity and convenience reference is made hereinbelow to EVOH as one preferred embodiment.

Non-polar thermoplastic polymers include, for example, polyolefins such as polyethylene, polypropylene (PP), polybutylene and the like. As exemplary polyethylenes there may be mentioned low density polyethylene (LDPE), high density polyethylene (HDPE), linear low density polyethylene (LLDPE) and the like. Ethylene-propylene copolymers (EP) are also suitable. The polyolefin is preferably hydrophobic, but may include one or more polymerized polar comonomers in a relatively minor proportion such that the generally hydrophobic nature of the non-polar polymer is retained. The non-polar polyolefin is incompatible with the polar polymer employed in the composition so that the advantages of incorporating the VPGO are realized.

Because of its suitability for use in food packages, PP is a preferred non-polar polyolefin in the composition of the present invention. For film applications, the PP may have a melt flow rate (MFR) of from about 0.1 to about 20, preferably from 1 to 10, and especially from 4 to 8. As used herein, MFR in reference to PP and EPR is determined in accordance with ASTM D-1238, condition 230° C. and 2.160 kg (condition L), unless otherwise specified. Although other non-polar polyolefins may be suitably employed in the present invention, for the purposes of clarity and convenience, PP is referred to hereinbelow as exemplary of a preferred embodiment.

The polyolefin which is grafted to form the VPGO used in the composition of the invention is preferably a polyolefin which meets the same characteristics described hereinabove for the non-polar polyolefin composition component. For purposes of clarity and convenience, PP is described herein as exemplary of the preferred embodiment of the polyolefin used for preparing the VPGO. PP may be grafted with a vinylpyrrolidone (VP) to a level of from about 2 to about 25 weight percent vinylpyrrolidone in the vinylpyrrolidone grafted polypropylene (VPGP), preferably from 4 to 20 weight percent and especially from 7 to 15 weight percent. The VPGP may have an MFR (or MI when the VPGO is a grafted polyethylene) of from about 0.1 to about 80, preferably from 0.5 to 20, and especially from 1 to 10. Exemplary vinylpyrrolidones for grafting onto the polyolefin include N-vinyl-2-pyrrolidone itself, as well as N-vinylpyrrolidones substituted at positions 3, 4, and 5 with one or more lower alkyl groups of up to eight carbon atoms, such as, for example, N-vinyl-3-methyl-pyrrolidone, N-vinyl-4-methyl-2-pyrrolidone, N-vinyl-5-methyl-2-pyrrolidone, N-vinyl-3,3-dimethyl-2-pyrrolidone, N-vinyl-4,4-dimethyl-2-pyrrolidone, and the like. N-vinyl-2-pyrrolidone is preferred because of its commercial availability.

The VP may be grafted onto the PP using any conventional technique which results in a VPGP, provided that the grafting method produces a concentration of VP sufficiently high to make the resulting VPGP an effective compatibilizer, and desirably yields grafting sites on substantially all of the PP chains. It is preferred to graft polymerize the VP onto molten PP, i.e., to effect the graft polymerization in a polypropylene or other polyolefin melt at elevated temperature in the presence of a suitable free radical initiator. The polyolefin to be grafted is heated at least to a temperature at which it is molten, but should not be heated above temperatures at which excessive volatilization of the vinylpyrrolidone or excessive polyolefin degradation occurs. Polypropylene is preferably premelted to a temperature of from about 180° to 250° C. preferably from 190° C. to 210° C. The monomer may be introduced to the melt with a free radical initiator dissolved or slurried therein. Suitable initiators include peroxides well known in the art. Exemplary peroxides which may be mentioned include dicumyl peroxide, t-butyl peroctoate, benzoyl peroxide, lauryl peroxide, t-butyl peroxypivalate, di-t-butyl peroxide, di(2-ethylhexyl) peroxide dicarbonate, t-butyl peracetate, 2,5-dimethyl-2,5-di(t-butylperoxy)hexyne-3 and the like. Azo compounds, such as, for example, azobis(1-cyano-1,4-dimethyl)butane, azobisisobutyronitrile and the like, are also contemplated as suitable initiators. The source of free radicals can also be ionizing radiation such as, for example, gamma ray irradiation of the melt.

In a particularly preferred embodiment, a portion of the polyolefin to be grafted is introduced as a slurry in a solution of monomer and radical initiator to the premelted remaining portion of the polyolefin to be grafted.

The grafting is effected under conditions of shear using conventional thermoplastic equipment, such as, for example, Brabender mixers, roll mills, extruders and the like. The mixing should be sufficient to obtain a substantially uniform distribution of VP grafted onto the PP while conditions of very high shear, such that degradation of the resulting period polypropylene results, are to be avoided. The reaction of the PP melt and the VP comonomer should proceed for a period of time sufficient to effect adequate graft copolymerization, but excessive reaction times resulting in severe degradation of the PP or other polyolefin should be avoided. Such degradation may include cross-linking in the case of polyethylenes as indicated by a decrease in melt index, and/or chain scission in the case of polypropylene, for example, as indicated by an increase in melt flow rate. Reaction times of from about 1 to about 30 minutes are generally suitable, while reaction times of from 2 to 20 minutes, and especially 5 to 12 minutes, are preferred. The level of grafting achieved also depends on a number of other factors, such as, for example, temperature, catalyst characteristics and quantity, ratio of monomer to polypropylene and the like, and may be controlled by selection thereof. Generally, a higher level of grafting is achieved by increased temperature, catalyst quantity and monomer proportions.

Following reaction, the molten mixture may be quenched and solidified for further processing, e.g. pellitization, comminution, extrusion thermoforming and/or molding, including blending with the EVOH and/or PP in the composition limits of the present invention. If desired, the ungrafted VP monomer and homopolymer may be removed from the grafted polypropylene product, for example, by solvent extraction, preferably in a boiling $C_1$–$C_4$ alcohol for several hours. However, the properties of the graft polypropylene have been found to generally not be adversely affected by the presence of homopolyvinylpyrrolidone, and any unreacted monomer can usually be removed by devolatilization, such as, for example, in the devolatilization zone of a devolatilizing extruder to obtain a grafted polypropylene product essentially free of vinylpyrrolidone monomer.

In the composition of the invention, the VPGP or VPGO is present at least at an interface between a first phase of EVOH or other polar thermoplastic polymer and a second phase of PP or another non-polar polyolefin. Because of the non-polar, hydrophobic nature of the PP backbone and the polar, hydrophilic nature of the grafted VP, the VPGP is generally miscible or compatible with both first and second phases. The VPGP may therefore be introduced into the composition in either or both of the EVOH and PP phases. When introduced into the PP phase, for example, by preblending 0.5–50 parts by weight of the VPGP with 100 parts by weight of the PP, the PP segments of the VPGP will be miscible with the PP phase, and the VPGP will remain primarily in the PP phase. The VPGP may also be mixed in the EVOH phase, for example, by melt blending 0.5–100 parts by weight of the VPGP with 100 parts by weight of the EVOH before introducing the EVOH phase to the PP phase.

The EVOH phase and the PP phase may both be continuous, for example, as in a laminate formed by coextrusion of a layer of each phase, or alternatively, one phase may be dispersed or suspended in the other, for example, as by extrusion of a blend thereof. In either case, the VPGP functions as a compatibilizing and adhesive agent to bind the two phases together at an interface therebetween by providing both non-polar and polar molecular regions. In a mixed phase system, the VPGP reduces and generally eliminates void spaces between particles of the incompatible phases through which oxygen and other gases might otherwise readily pass. In a continuous system, the VPGP promotes adhesion so that the tie layer, conventionally employed between the EVOH and PP layers, can be eliminated and the EVOH can be directly laminated to an adjacent polypropylene layer.

In one embodiment of the invention, the composition comprises mixed phases of the EVOH or other polar polymer, and the polypropylene or other non-polar polymer The VPGP is present in either or both of the EVOH and the PP phases, but is at least interfacially present between the mixed phases so as to compatibilize or promote adhesion thereof. The weight ratio of PP to EVOH may vary from about 10:90 to about 90:10, depending on the oxygen transmission rate requirements of the end use package, or stated differently, the PP may comprise from about 10 to about 900 parts by weight per 100 parts by weight of the EVOH. Depending on the relative proportions of EVOH and PP employed, the polypropylene phase may be continuous with particles of the EVOH phase dispersed therein, or it may be suspended as particles throughout a matrix of the EVOH phase. In any case, the VPGP is blended with either or both the PP and EVOH so that it is present at the interfaces between the matrix phase and the particles of the dispersed phase. The amount of VPGP employed depends primarily on the amount of EVOH in the blend, and the VPGP is preferably present at from 0.5 to 50 parts by weight per 100 parts by weight of the EVOH, more preferably at 1 to 15 parts by weight, and especially at 2 to 6 parts by weight.

In the mixed phase embodiment, the composition may be prepared by melt blending the components, together or in any order on conventional equipment such as roll mills, Brabender mixers, extruders or the like, and then extruding or molding the melt blend; or by first dry blending the particulated components, and then extruding the dry blend directly into a film or sheet, or molding the dry blend according to conventional compression molding or thermoforming techniques. However, it has been found that lower oxygen transmission rates are obtained by melt blending the VPGP with the EVOH prior to blending with the polypropylene. It has also been found that excessive mixing of the PP and EVOH blend is to be avoided since the oxygen transmission rate of the resulting product increases rapidly if the EVOH phase is too finely dispersed in the polypropylene phase.

Monolayer films or sheets of the mixed phase polypropylene and EVOH composition containing the VPGP have been found to have low oxygen transmission rates. This is a rather surprising result since films made from a blend of the polypropylene (generally a poor oxygen barrier) and the EVOH (generally a good oxygen barrier) without the VPGP have extremely high oxygen transmission rates which are higher than that of the polypropylene alone. The mixed-phase monolayer may be used alone, or, if desired, may be used as one or more layers in a laminate. Such films and sheets can also be used to heat the contents thereof in boiling water and by microwave convection.

In the multilayer embodiment, the laminate includes a layer of the EVOH or another polar thermoplastic polymer and at least one layer of the polypropylene or another non-polar polyolefin adhered or laminated directly to either surface of the EVOH layer. Conventional procedures on conventional equipment, e.g. coextrusion, may be used to produce the laminate. Films and sheets, for example, may be manufactured with an interlayer of the EVOH and an outer layer of polypropylene adhered on each side thereof. The EVOH interlayer may have any suitable thickness, depending on the oxygen permeability desired, for example, from 0.1 to 20 mils or more, and the total thickness of the film may vary, for example, from 0.5 to 250 mils or more. The VPGP may be present in either or both the EVOH layer or the polypropylene layers. The VPGP is preferably blended with the EVOH or PP at a relative proportion of VPGP to 100 parts by weight of the EVOH or the PP of from about 0.5 to about 50 parts by weight, preferably from 1 to 10, and especially from 2 to 6 parts by weight.

The tieless, trilayer laminate has properties similar to the conventional 5-layer PP/tie layer/EVOH/ tie layer/PP films, but has a distinct advantage in that the necessity for the tie layers is eliminated.

The invention is illustrated by way of the examples which follow.

EXAMPLE 1

Graft polymerization of N-vinylpyrrolidone onto polypropylene was effected by premelting 130 g of polypropylene (MFR 10) in a Brabender mixer at 200° C. under a nitrogen blanket. A slurry containing 60 g of the polypropylene in powder form, 0.8 g dicumyl peroxide and 30 g N-vinyl-2-pyrrolidone was added to the melt over a period of two minutes while the mixer rotors turned at 30 rpm. The rotor speed was increased to 60 rpm and mixing continued for an additional ten minutes. The product was removed from the mixer, chopped and ground to a powder. The ground product was extracted in boiling isopropyl alcohol for five hours, and the products before and after extraction were analyzed for total nitrogen by the Dumas method. The product before extraction had a vinylpyrrolidone concentration of 11.7 weight percent (1.48 weight percent nitrogen) while the product following extraction had a concentration of vinylpyrrolidone of 8.9 weight percent (1.12 weight percent nitrogen). On this basis, about 76% of the N-vinylpyrrolidone in the crude product was grafted onto the polypropylene since it was not extracted by the hot isopropyl alcohol.

EXAMPLE 2

The general procedure of Example 1 was followed to melt graft polymerize N-vinylpyrrolidone onto polypropylene. Using a rotor speed of 20 rpm, 100 g polypropylene (MFR 10) was premelted in a Brabender mixer at 200° C. A slurry of 90 g of the polypropylene in powder form and 0.8 g Cicumyl peroxide in 30 g N-vinylpyrrolidone was added to the melt under a nitrogen blanket. The rotor speed was increased to 60 rpm and the polymer was removed from the mixing head after 10 minutes of mixing. The product was chopped and ground to a powder, and following boiling alcohol extraction, analyzed to contain 12.5 weight percent vinylpyrrolidone in the graft copolymer based on total nitrogen (1.58 weight percent) determined according to the Dumas method.

EXAMPLE 3

A VPGP containing more than 20 weight percent vinylpyrrolidone was obtained by premelting 100 g polypropylene (MFR 10) in a Brabender mixer at 200° C. and adding a slurry of 70 g of the polypropylene in powder form and 0.8 g dicumyl peroxide in 50 g N-vinylpyrrolidone under a nitrogen blanket. After mixing 10 minutes with a rotor speed of 60 rpm, 210 g of polymer was removed from the mixing head, chopped and ground to a powder. The resulting graft copolymer contained 21.0 weight percent vinylpyrrolidone based on total nitrogen content (2.65 weight percent) determined by the Dumas method.

EXAMPLE 4

VPGP containing about 7% vinylpyrrolidone was prepared by melting 100 g of polypropylene (MFR 10) in a Brabender mixer under a nitrogen blanket at 200° C. using a rotor speed of 30 rpm. A slurry containing 102.4 g of the polypropylene in powder form and 0.8 g dicumyl peroxide in 17.6 g N-vinylpyrrolidone was added over a period of about 1 minute, and the mixture was mixed under nitrogen at 60 rpm for an additional 10 minutes. The product was removed from the mixing head, chopped and ground to a powder. The resulting graft copolymer contained 6.9 weight percent vinylpyrrolidone, based on total nitrogen content (0.88 weight percent) determined according to the Dumas method.

EXAMPLES 5-12

N-vinylpyrrolidone was grafted onto polypropylene at varying reaction times, dicumyl peroxide concentrations, and ratios of vinylpyrrolidone to polypropylene to illustrate the effects thereof on the melt flow rates and the compositions of the resulting products. A 100 g portion of polypropylene (MFR 10) was premelted in a Brabender mixer under a nitrogen blanket at 200° C. using a rotor speed of 20-30 rpm. A slurry of the remaining portion of the polypropylene in powder form and dicumyl peroxide in N-vinylpyrrolidone was added to the melt over a 2 minute period. The rotor speed was increased to 60 rpm and mixing continued for 5 or 10 minutes after which the product was a homogeneous melt. The products were chopped and ground to a fine powder, and extracted with boiling isopropyl alcohol for several hours to remove unreacted monomer and homopolyvinylpyrrolidone. The amounts of reactants, reaction times, and the resulting vinylpyrrolidone content and MFR of the products are tabulated in Table I.

then increased to 60 rpm, and mixing continued for 10 minutes. The product was removed from the mixing head, chopped, ground to a powder and unreacted vinylpyrrolidone and homopolyvinylpyrrolidone were extracted in boiling alcohol for several hours. The product contained 13.8 weight percent vinylpyrrolidone based on an elemental nitrogen content (1.74 weight percent) determined according to the Dumas method.

TABLE I

| | REACTION QUANTITIES (g) | | | | PRODUCT PROPERTIES | |
|---|---|---|---|---|---|---|
| EXAMPLE | POLY-PROPYLENE | N-VINYL-PYRROLIDONE | DICUMYL PEROXIDE | REACTION TIME (minutes) | VINYLPYRROLIDONE CONTENT (wt. %) | MFR |
| 5 | 202 | 17.6 | 0.80 | 10 | 6.34 | 75 |
| 6 | 202 | 17.6 | 0.80 | 5 | 5.47 | 57 |
| 7 | 202 | 17.6 | 0.40 | 10 | 6.10 | 33 |
| 8 | 202 | 17.6 | 0.40 | 5 | 5.55 | 25 |
| 9 | 190 | 30.0 | 0.80 | 10 | 8.56 | 92 |
| 10 | 190 | 30.0 | 0.80 | 5 | 9.03 | 43 |
| 11 | 190 | 30.0 | 0.40 | 10 | 8.00 | 39 |
| 12 | 190 | 30.0 | 0.40 | 5 | 7.53 | 25 |

The data shown in Table I illustrate that the vinylpyrrolidone content of the VPGP can be controlled by the ratio of vinylpyrrolidone to polypropylene in the reaction mixture, the quantity of catalyst used, and the reaction time. The increase in melt flow rates in the resulting graft copolymers indicates that some molecular weight degradation occurred, and further that the degree of degradation was directly related to the concentration of peroxide in the reactants and the reaction time.

EXAMPLES 13-15

Various amounts of N-vinylpyrrolidone were used to dissolve 0.80 g dicumyl peroxide, and the solution was mixed with 100 g polypropylene (MFR 10) in powder form since the powder absorbed the monomer better than pellets. Various amounts of the polypropylene were premelted in a Brabender mixer at 200° C. The slurry of polypropylene in the vinylpyrrolidone-dicumyl peroxide solution was added to the melt under a nitrogen blanket. After mixing with a rotor speed of 60 rpm for 10 minutes, the product was removed from the Brabender mixer, ground to a powder in a Hiley mill and extracted with boiling methanol. The quantities of reactants used, the vinylpyrrolidone content of the graft copolymers based on nitrogen analysis using the Dumas method, and the MFR of the products are presented in Table II.

EXAMPLE 17

N-vinylpyrrolidone was grafted onto LDPE by premelting 90 g of LLDPE (MI 1.92, density 0.918 g/cm$^3$) in a Brabender mixer at 200° C. under a blanket of nitrogen using a rotor speed of 30 rpm and adding a slurry of 100 g of the polyethylene and 0.4 g dicumyl peroxide in 22 g N-vinylpyrrolidone over a 2 minute period. The rotor speed was increased to 60 rpm and mixing continued for 10 additional minutes. The product was removed from the mixing head, chopped, ground to a powder, and extracted with boiling isopropyl alcohol for several hours to remove unreacted N-vinylpyrrolidone and ungrafted homopolyvinylpyrrolidone. A sample was dried for analysis and was determined to contain 8.8 weight percent vinylpyrrolidone based on the elemental nitrogen content (1.11 weight percent) determined by the Dumas method.

EXAMPLE 18

N-vinylpyrrolidone was grafted onto LDPE by premelting 105.8 g of polyethylene (MI 1.92; density 0.918 g/cm$^3$) in a Brabender mixer at 200° C. under a blanket of nitrogen using a rotor speed of 30 rpm and adding a slurry of 100 g of the polyethylene in powder form and 0.20 g dicumyl peroxide in 4.2 g N-vinylpyrrolidone over a 2 minute period The rotor speed was increased to

TABLE II

| | REACTION QUANTITIES (g) | | PRODUCT PROPERTIES | |
|---|---|---|---|---|
| | | | VINYLPYRROLIDONE | |
| EXAMPLE | POLYPROPYLENE | N-VINYLPYRROLIDONE | CONTENT (wt. %) | MFR |
| 13 | 211 | 9 | 2.85 | 79.1 |
| 14 | 190 | 30 | 8.72 | 71.8 |
| 15 | 170 | 50 | 11.65 | 50.4 |

These results show that the quantity of vinylpyrrolidone graft polymerized onto polypropylene is proportional to the ratio of vinylpyrrolidone to polypropylene in the reactants.

EXAMPLE 16

N-vinylpyrrolidone was graft polymerized onto polypropylene by premelting 100 g of polypropylene (MFR 10) in a Brabender mixer at 200° C. and adding a slurry of 70 g polypropylene powder and 0.8 g dicumyl peroxide in 50 g of N-vinylpyrrolidone over a 1-2 minute period under a nitrogen blanket. The rotor speed was 60 rpm and mixing continued for 10 additional minutes. The product was removed from the mixing head, chopped, ground to a powder, and extracted with boiling isopropyl alcohol for several hours to remove unreacted N-vinylpyrrolidone and homopolyvinylpyrrolidone. A sample was dried for analysis and was determined to contain 1.18 weight percent vinylpyrrolidone based on the elemental nitrogen content (0.15 weight percent) determined by the Dumas method.

EXAMPLES 19-27

N-vinyl-2-pyrrolidone was graft polymerized onto a polypropylene having a MFR of 0.5 using Lupersol 130 peroxide as radical initiator. One hundred grams of the polypropylene was melted in a Brabender mixer at 190° C. or 210° C. A slurry of 90 g of additional polypropylene was added in a solution of the vinylpyrrolidone (30 g) and Lupersol 130 initiator (0.2, 0.4 or 0.8 g). The reaction mixtures were mixed for 5 or 10 minutes using a rotor speed of 60 rpm. The products were removed from the reaction chamber and chopped and ground to a fine powder. A portion of the powder was extracted with boiling 2-propanol. The quantities of initiator used, reaction times and temperatures, and product MFR's and vinylpyrrolidone contents before and after extraction are presented in Table III.

at 25° C., 0% relative humidity and 760 mm Hg, normalized to 2 mil thicknesses, assuming a linear relationship of oxygen transmission rate with film thickness, are presented in Table IV.

The data presented in Table IV show that the oxygen transmission rate of a monolayer film extruded from blends of polypropylene, EVOH and VPGP increases as the concentration of ethylene-vinyl alcohol copolymer in the blend is decreased.

EXAMPLES 31-60

Blends for EVOH, PP and VPGP were compression molded for oxygen transmission rate measurements. The films were prepared by premelting PP (MFR 2.8) in a Brabender mixer at 200° C. A dry blend of EVOH (73 mole percent vinyl alcohol, MI 1.6), VPGP and Irganox 1010 (0.10 weight percent) was added over a

TABLE IV

| EXAMPLE | COMPOSITION OF DRY BLEND (g) | | | FILM COMPOSITION (wt. %) | | | OXYGEN TRANSMISSION RATE (25° C., 760 mmHg, normalized to 2 mil film; cm³/m²/day) |
|---|---|---|---|---|---|---|---|
| | EVOH/VPGP MELT BLEND* | PP | IRGANOX 1010 | VPGP | EVOH | PP | |
| 28 | 360 | 540 | 0.90 | 1.5 | 38.5 | 60.0 | 6.65 |
| 29 | 270 | 630 | 0.90 | 1.1 | 28.8 | 70.1 | 26.6 |
| 30 | 180 | 720 | 0.90 | 0.8 | 19.2 | 80.0 | 296 |

*EVOH/VPGP blends were 3.8 wt. % VPGP.

EXAMPLES 28-30

A melt blend of 9 parts VPGP (13.75 weight percent vinylpyrrolidone) in 225 parts EVOH (27 mole percent ethylene; MI 1.6) was prepared by melting the EVOH in a Brabender mixer at 200° C., adding the grafted copolymer, and continuing mixing for 3 minutes. The blend was chopped and ground to particles about 1 mm in diameter. Dry blends of this melt blend, polypropylene powder (MFR 6) and Irganox 1010 stabilizer were prepared in various proportions, pelletized and extruded into films 2.3-3.1 mils thick. The compositions of the blends used to make the films, the compositions of the films, and the oxygen transmission rates of the films period of two minutes. The blend was mixed for six minutes at 200° C. and 60 rpm rotor speed. The blend was removed from the mixer, cooled, chopped and ground to a powder in a Wiley mill. After drying in a vacuum oven at 90°-95° C. in the presence of phosphorous pentoxide for 48 hours, each product was compression molded into a film. The vinylpyrrolidone content of the VPGP, the composition of the film, the MFR of the film, the film thickness, and the oxygen transmission rate of each film at 25° C., 760 mm Hg and 0% relative humidity are presented in Table V. Similar data are included for polypropylene and ethylene-vinyl alcohol copolymer films (Examples 59 and 60, respectively) for comparison purposes.

TABLE V

| EXAMPLE | N-VINYL-PYRROLIDONE IN VPGP (wt. %) | VPGP CONTENT IN BLEND (wt. %) | EVOH IN BLEND (wt. %) | MFR | FILM THICKNESS (mils) | OXYGEN TRANSMISSION RATE (cm³/m²/day at 25° C., 0% R.H. (normalized to 4 mil) |
|---|---|---|---|---|---|---|
| 31 | 1.46 | 5 | 50 | 4.94 | 4.09 | 48.2 |
| 32 | 1.46 | 5 | 50 | 4.94 | 3.04 | 49.2 |
| 33 | 2.85 | 5 | 10 | 3.56 | 4.46 | 623 |
| 34 | 2.85 | 5 | 10 | 3.56 | 4.87 | 493 |
| 35 | 2.85 | 5 | 50 | 4.72 | 5.09 | 193 |
| 36 | 2.85 | 5 | 50 | 4.72 | 4.34 | 221 |
| 37 | 11.58 | 5 | 10 | 3.11 | 3.89 | 632 |
| 38 | 11.58 | 5 | 10 | 3.11 | 4.25 | 641 |
| 39 | 8.72 | 15 | 30 | 3.65 | 4.06 | 436 |
| 40 | 8.72 | 15 | 30 | 3.65 | 4.21 | 415 |
| 41 | 8.72 | 15 | 30 | 3.64 | 3.91 | 466 |
| 42 | 8.72 | 15 | 30 | 3.64 | 3.81 | 452 |
| 43 | 8.72 | 15 | 30 | 3.57 | 2.96 | 446 |
| 44 | 8.72 | 15 | 30 | 3.57 | 3.45 | 445 |
| 45 | 2.85 | 25 | 10 | 3.11 | 4.07 | 613 |
| 46 | 2.85 | 25 | 10 | 3.11 | 3.47 | 623 |
| 47 | 2.85 | 25 | 50 | 5.15 | 3.63 | 298 |
| 48 | 2.85 | 25 | 50 | 5.15 | 3.27 | 298 |
| 49 | 11.58 | 25 | 10 | 4.70 | 3.39 | 565 |
| 50 | 11.58 | 25 | 10 | 4.70 | 3.43 | 575 |
| 51 | 11.58 | 25 | 50 | 5.05 | 3.16 | 267 |
| 52 | 11.58 | 25 | 50 | 5.05 | 4.12 | 258 |
| 53 | — | 0 | 10 | 5.29 | 3.48 | 625 |
| 54 | — | 0 | 10 | 5.29 | 3.06 | 618 |
| 55 | — | 0 | 30 | 6.34 | 3.91 | 7182 |
| 56 | — | 0 | 30 | 6.34 | 3.91 | 2516 |
| 57 | — | 0 | 50 | 4.74 | 3.62 | >10,000 |

TABLE V-continued

| EXAMPLE | N-VINYL-PYRROLIDONE IN VPGP (wt. %) | VPGP CONTENT IN BLEND (wt. %) | EVOH IN BLEND (wt. %) | MFR | FILM THICKNESS (mils) | OXYGEN TRANSMISSION RATE ($cm^3/m^2$/day at 25° C., 0% R.H. (normalized to 4 mil) |
|---|---|---|---|---|---|---|
| 58 | — | 0 | 50 | 14.74 | 3.05 | >10,000 |
| 59[1] | — | 0 | 0 | N/A[3] | 4.70 | 865 |
| 60[2] | — | 0 | 100 | N/A | — | ≈2 |

Notes for TABLE V:
[1] Film grade polypropylene available under the designation XXP-324; data were obtained from manufacturer's literature.
[2] EVALCA type EP-L; 27 mole percent ethylene, 73 mole percent vinyl alcohol; MI 1.6; data were obtained from manufacturer's literature.
[3] N/A = Not Available.

The data presented in Table V show the effects of the concentration of VP in the VPGP, the concentration of VPGP in the blend, and the concentration of EVOH on the film oxygen transmission rate. VPGP has a significant effect on the oxygen transmission rate of films of blends of polypropylene and EVOH. The concentration of the vinylpyrrolidone in the graft copolymer as well as the concentration of the graft copolymer in the film is important. Note the extremely high oxygen transmission rates of the films without VPGP (Examples 55-76) and that this is not improved at higher EVOH content (see Examples 57 and 58).

EXAMPLES 61-73

Blends of VPGP with EVOH or PP were made by first mixing the VPGP with melted EVOH or polypropylene in a Brabender mixer for 3 minutes at 210° C. or 220° C., respectively. The EVOH used in these experiments was EVALCA Type EP-L which was 27 mole percent ethylene. The polypropylene was Exxon P4092. The blends were then chopped and milled to particles about 1 mm in diameter. The EVOH blends were then mixed with polypropylene powder and the polypropylene blends were mixed with EVOH powder. Both powders had about the same particle size as the melt blends with which they were being mixed. The dry blends were then extruded through a 1" extruder and pelletized. After drying the pellets at 100° C. over phosphorous pentoxide in a vacuum oven for several hours, they were extruded into films. The oxygen transmission rates of the films were measured at 0% and 80% relative humidities at 30° C. using an Ox-Tran 1000H instrument obtained from Modern Controls, Inc. The composition of the films and the oxygen transmission rate data are recorded in Table VI.

The foregoing data show that the presence of VPGP in monolayer films composed of blends of EVOH and polypropylene significantly decrease the oxygen transmission rate of the films. Concentrations of vinylpyrrolidone in the VPGP over the range of from about 5 to 20 or more weight percent are effective. Films of blends made by first melt blending the VPGP with the EVOH and then mixing this first blend with the polypropylene had lower oxygen transmission rates than films of comparable compositions which were made by first melt blending the VPGP with the polypropylene and then melt blending this first blend with the EVOH. The oxygen transmission rates of the former were generally less sensitive to moisture than the latter. Note that Example 73 which was extruded from a blend of EVOH and polypropylene without VPGP was very porous to oxygen and the transmission rate was too high to be measured by the instrument. The relatively low oxygen transmission rates of all other films show that the presence of VPGP in the EVOH/PP films had a significant effect on their oxygen permeabilities.

EXAMPLES 74 AND 75

Blends of EVOH (27 mole percent ethylene, MI 1.6) and polypropylene (MFR 10) prepared with and without VPGP (7 wt. % vinylpyrrolidone) were made by mixing the melted components in a 22 Brabender mixer at 190° C. for 5 minutes. Each blend was stabilized with Irganox 1010 at a concentration of 0.10 weight percent. After chopping and milling the products to granular size particles, they were compression molded into films and their oxygen transmission rates were measured at 25° C. and 0% relative humidity. The film compositions and oxygen transmission rates are presented in Table VII.

TABLE VI

| EXAMPLE | VPGP BLENDED WITH: | VINNYLPYRROLIDONE CONTENT IN VPGP (wt. %) | VPGP IN FILM (wt. %) | POLYPROPYLENE CONTENT IN FILM (wt. %) | OXYGEN TRANSMISSION RATE ($cm^3/m^2$/day at 30° C., (normalized to 2 mil)) | |
|---|---|---|---|---|---|---|
| | | | | | 0% RELATIVE HUMIDITY | 80% RELATIVE HUMIDITY |
| 61 | EVOH | 12.5 | 1.67 | 58.3 | 2.46 | 13.81 |
| 62 | EVOH | 12.5 | 4.44 | 58.3 | 8-30 | 26-55 |
| 63 | EVOH | 12.5 | 0.80 | 59.2 | 4.22 (2.45-5.98) | 18.50 (15-22) |
| 64 | EVOH | 21.0 | 1.67 | 58.3 | 4.94 | 13.95 |
| 65 | EVOH | 13.75 | 1.67 | 58.3 | 2.88 | 17.05 |
| 66 | EVOH | 6.95 | 1.67 | 58.3 | 2.44 | 24.46 |
| 67 | PP | 6.95 | 1.67 | 58.3 | 3.06 | 27.48 |
| 68 | PP | 12.50 | 1.67 | 58.3 | 3.18 | 26.80 |
| 69 | PP | 12.50 | 2.51 | 57.5 | 5.01 | 26.48 |
| 70 | PP | 12.50 | 4.26 | 55.7 | 12.22 | 38.54 |
| 71 | PP | 13.75 | 1.67 | 58.3 | 4.28 | 26.07 |
| 72 | PP | 21.00 | 1.67 | 58.3 | 5.43 | 36.00 |
| 73 | N/A | — | 0 | 60.0 | Too high to measure | Too high to measure |

TABLE VII

| EXAMPLE | EVOH CONTENT (wt. %) | POLYPROPYLENE CONTENT (wt. %) | VPGP CONTENT (wt. %) | OXYGEN TRANSMISSION RATE ($cm^3/m^2$/day, normalized to 2 mils) |
|---|---|---|---|---|
| 74 | 50 | 35 | 15 | 135 |
| 75 | 50 | 50 | 0 | <10,000 |

The foregoing data show the effect of the presence of VPGP on the oxygen transmission rate of a compression molded film of a blend of EVOH and polypropylene. In the absence of VPGP, there is no adhesion of the EVOH to the polypropylene so that the transmission of oxygen is enhanced by very small void spaces between the two phases. VPGP enhances the adhesion of the two immiscible phases so that oxygen diffuses through the film, via a tortuous path which slows down its rate of transmission, rather than through small spaces which offer no resistance to its transmission.

The foregoing description of the invention is illustrative and explanatory thereof. Various modifications will occur to those skilled to the art in view of the foregoing disclosure. All such variations which fall within the scope or spirit of the appended claims are intended to be embraced thereby.

What is claimed is:

1. A theromplastic composition, comprising:
   a polar thermoplastic polymer;
   a non-polar polyolefin, said non-polar polyolefin being incompatible with said polar thermoplastic polymer; and
   a compatibilizer consisting of a vinylpyrrolidone grafted polyolefin at least interfacially present in an amount effective to compatibilize said polar thermoplastic polymer and said non-polar polyolefin.

2. The composition of claim 1, wherein said polar thermoplastic polymer is selected from polyamide, polyester, polyvinyl chloride, polyvinylidene chloride, polyurea, polycarbonate, polyacrylonitrile, polyacrylate, polymethacrylate, polyvinyl alcohol and cellulose.

3. The composition of claim 1, wherein said polar thermoplastic polymer comprises ethylene-vinyl alcohol copolymers.

4. The composition of claim 3, wherein said ethylene-vinyl alcohol copolymer comprises from 30 to 80 mole percent vinyl alcohol.

5. The composition of claim 4, wherein said ethylene-vinyl alcohol copolymer has a melt index of from 0.1 to 20.

6. The composition of claim 1, wherein said grafted polyolefin comprises from 2 to 25 weight percent vinylpyrrolidone.

7. The composition of claim 6, wherein said grafted polyolefin is a graft of a polyolefin selected from polyethylene, polypropylene and ethylene-propylene copolymer.

8. The composition of claim 6, wherein said grafted polyolefin is a grafted polypropylene.

9. The composition of claim 6, wherein said vinylpyrrolidone is selected from N-vinyl-2-pyrrolidone and N-vinyl-2-pyrrolidones substituted at positions 3, 4 or 5 with one or more alkyl groups of up to 8 carbon atoms.

10. The composition of claim 6, wherein said vinylpyrrolidone is N-vinyl-2-pyrrolidone.

11. The composition of claim 1, wherein said grafted polyolefin has a melt flow rate or melt index (PE) of from 0.1 to 80.

12. The composition of claim 1, wherein said polar thermoplastic polymer has a melt index of from 0.1 to 20.

13. The composition of claim 1, wherein said non-polar polyolefin is selected from polyethylene, ethylene-propylene copolymer and polypropylene.

14. The composition of claim 8, wherein said non-polar polyolefin comprises polypropylene.

15. The composition of claim 1, wherein from 0.5 to 50 parts by weight of said vinylpyrrolidone grafted polyolefin are present in said composition for each 100 parts by weight of said polar thermoplastic polymer.

16. The composition of claim 1, wherein from 0.5 to 50 parts by weight of said vinylpyrrolidone grafted polyolefin are present in said composition for each 100 parts by weight of said non-polar polyolefin.

17. An oxygen barrier composition, comprising:
   a monolayer of mixed first and second phases comprising ethylene-vinyl alcohol copolymer, a non-polar polyolefin and a compatibilizer consisting of a vinylpyrrolidone grafted polyolefin at least interfacially present between said ethylene-vinyl alcohol copolymer and said non-polar polyolefin in a mixed phase blend.

18. The composition of claim 17, wherein said composition is formed by extrusion of a mixture of said ethylene-vinyl alcohol copolymer, said non-polar polyolefin and said grafted polyolefin.

19. The composition of claim 18, wherein said mixture is formed by admixing said non-polar polyolefin with a melt blended mixture of said ethylene-vinyl alcohol copolymer and said vinylpyrrolidone grafted polyolefin.

20. The composition of claim 17, wherein said ethylene-vinyl alcohol copolymer comprises from 30 to 80 mole percent vinyl alcohol.

21. The composition of claim 20, wherein said ethylene-vinyl alcohol copolymer has a melt index of from 0.1 to 20.

22. The composition of claim 17, wherein said grafted polyolefin comprises from 2 to 25 weight percent vinylpyrrolidone.

23. The composition of claim 22, wherein said vinylpyrrolidone is selected from N-vinyl-2-pyrrolidone and N-vinyl-2-pyrrolidones substituted at positions 3, 4, or 5 with one or more alkyl groups having up to 8 carbon atoms.

24. The composition of claim 22, wherein said vinylpyrrolidone is N-vinyl-2-pyrrolidone.

25. The composition of claim 22, wherein said grafted polyolefin is a graft of a polyolefin selected from polyethylene, polypropylene and ethylene-propylene copolymer.

26. The composition of claim 22, wherein said grafted polyolefin is grafted polypropylene.

27. The composition of claim 17, wherein said grafted polyolefin has a melt flow rate or melt index of from 0.1 to 80.

28. The composition of claim 17, wherein said ethylene-vinyl alcohol copolymer has a melt index of from 0.1 to 20.

29. The composition of claim 17, wherein said non-polar polyolefin is selected from polyethylene, ethylene-propylene copolymer and polypropylene.

30. The composition of claim 26, wherein said non-polar polyolefin comprises polypropylene.

31. The composition of claim 17, wherein from 0.5 to 50 parts by weight of said vinylpyrrolidone grafted polyolefin are present in said composition for each 100 parts by weight of said ethylene-vinyl alcohol copolymer.

32. The composition of claim 26, wherein said composition is formed by extrusion of an admixture of said ethylene-vinyl alcohol copolymer and a melt blend of said polypropylene and said vinylpyrrolidone grafted polypropylene.

33. The composition of claim 32, wherein from 0.5 to 50 parts by weight of said vinylpyrrolidone grafted polypropylene are present in said non-polar polyolefin for each 100 parts by weight of said ethylene-vinyl alcohol copolymer.

34. An oxygen barrier film or sheet, comprising:
mixed first and second phases in a monolayer wherein one of said phases is suspended in said other phase;
said first phase comprising a blend of (i) 100 parts by weight of ethylene-vinyl alcohol copolymer containing from 30 to 80 mole percent vinyl alcohol and having a melt index of from 0.1 to 20 and (ii) from 0.5 to 50 parts by weight of a compatibilizer consisting of a vinylpyrrolidone grafted polypropylene containing from 2 to 25 weight percent vinylpyrrolidone and having a melt flow rate from 0.1 to 80, said vinylpyrrolidone being selected from N-vinyl-2-pyrrolidone and N-vinyl-2-pyrrolidone substituted in the 3, 4, or 5 position with one or more alkyl groups of up to 8 carbon atoms;
said second phase comprising polypropylene having a melt flow rate from 0.1 to 20;
said second phase present in said monolayer at from 10 to 900 parts by weight for each said 100 parts by weight of said ethylene-vinyl alcohol copolymer.

35. The film or sheet of claim 34, wherein said ethylene-vinyl alcohol copolymer contains from 40 to 75 mole percent vinyl alcohol and has a melt flow rate of from 1 to 10.

36. The film or sheet of claim 34, wherein said ethylene-vinyl alcohol copolymer contains from 50 to 72 mole percent vinyl alcohol and has a melt index of from 1 to 8.

37. The film or sheet of claim 34, wherein said vinylpyrrolidone grafted polypropylene contains from 4 to 20 weight percent vinylpyrrolidone.

38. The film or sheet of claim 34, wherein said vinylpyrrolidone grafted polypropylene contains from 7 to 15 weight percent vinylpyrrolidone.

39. The film or sheet of claim 34, wherein said vinylpyrrolidone comprises N-vinyl-2-pyrrolidone.

40. The film or sheet of claim 34, wherein said blend comprises from 1 to 10 parts by weight of said vinylpyrrolidone grafted polypropylene.

41. The film or sheet of claim 34, wherein said blend comprises from 2 to 6 parts by weight of said vinylpyrrolidone grafted polypropylene.

42. The film or sheet of claim 34, wherein said polyvinylpyrrolidone grafted polypropylene has a melt flow rate of from 0.5 to 20.

43. The film or sheet of claim 34, wherein said polyvinylpyrrolidone grafted polypropylene has a melt flow rate of from 1 to 10.

44. The film or sheet of claim 34 wherein said polypropylene has a melt flow rate of from 1 to 10.

45. The film or sheet of claim 34, wherein said polypropylene has a melt flow rate of from 4 to 8.

46. A thermoplastic composition comprising, in combination:
a monolayer of mixed first and second phases;
said first phase comprising a polar thermoplastic vinyl alcohol copolymer and a compatibilizer consisting of a vinylpyrrolidone grafted polyolefin;
said second phase comprising a non-polar polyolefin in contact with said first phase; and
said vinylpyrrolidone grafted polyolefin is at least interfacially present in an amount effective to compatibilize said first and second phases.

47. The composition of claim 46, wherein said polar thermoplastic vinyl alcohol copolymer is ethylene-vinyl alcohol copolymer.

48. The composition of claim 46, wherein said vinylpyrrolidone is N-vinyl-2-pyrrolidone.

49. The composition of claim 46, wherein said second phase non-polar polyolefin comprises polypropylene.

50. The composition of claim 46, wherein said grafted polyolefin is polypropylene.

* * * * *